(12) United States Patent
Shin et al.

(10) Patent No.: US 12,448,550 B2
(45) Date of Patent: Oct. 21, 2025

(54) DUAL-CURABLE ADHESIVE COMPOSITION

(71) Applicant: HANSOL CHEMICAL CO., LTD., Seoul (KR)

(72) Inventors: Chanho Shin, Gwangju (KR); Joohan Woo, Jeonju-si (KR); Cheolwoo Lee, Jeollabuk-do (KR); Sungmin Ha, Jeollabuk-do (KR); Chunrae Nam, Jeonju-si (KR)

(73) Assignee: HANSOL CHEMICAL CO., LTD., Seoul (KR)

( * ) Notice: Subject to any disclaimer, the term of this patent is extended or adjusted under 35 U.S.C. 154(b) by 686 days.

(21) Appl. No.: 17/781,692

(22) PCT Filed: Dec. 5, 2019

(86) PCT No.: PCT/KR2019/017129
§ 371 (c)(1),
(2) Date: Jun. 1, 2022

(87) PCT Pub. No.: WO2021/112296
PCT Pub. Date: Jun. 10, 2021

(65) Prior Publication Data
US 2023/0015729 A1    Jan. 19, 2023

(30) Foreign Application Priority Data
Dec. 3, 2019 (KR) .................. 10-2019-0158833

(51) Int. Cl.
*C09J 133/04* (2006.01)
*C09J 4/06* (2006.01)
*C09J 11/06* (2006.01)
*C08K 5/37* (2006.01)

(52) U.S. Cl.
CPC ............. *C09J 133/04* (2013.01); *C09J 4/06* (2013.01); *C09J 11/06* (2013.01); *C08K 5/37* (2013.01); *C09J 2301/312* (2020.08); *C09J 2301/416* (2020.08)

(58) Field of Classification Search
None
See application file for complete search history.

(56) References Cited

U.S. PATENT DOCUMENTS

| | | | | |
|---|---|---|---|---|
| 7,211,368 B2* | 5/2007 | Coats | ........... | B33Y 10/00 526/261 |
| 7,348,132 B2* | 3/2008 | Teng | ........... | G03F 7/38 430/435 |
| 9,708,518 B2* | 7/2017 | Zhang | ........... | C09J 175/16 |
| 9,890,304 B2* | 2/2018 | Yurt | ........... | C09J 133/14 |
| 10,035,328 B2* | 7/2018 | Clapper | ........... | C09J 4/06 |
| 10,035,334 B2* | 7/2018 | Clapper | ........... | C09J 4/00 |
| 11,866,609 B2* | 1/2024 | Campbell | ........... | B32B 27/32 |
| 12,180,392 B2* | 12/2024 | Natori | ........... | C09J 11/04 |
| 2006/0154169 A1* | 7/2006 | Timpe | ........... | G03F 7/031 430/141 |
| 2011/0021655 A1* | 1/2011 | Smothers | ........... | C09J 4/00 522/63 |
| 2013/0284360 A1* | 10/2013 | Held | ........... | C09J 133/14 522/18 |
| 2014/0142210 A1* | 5/2014 | Zhang | ........... | C08F 290/067 526/320 |
| 2018/0134919 A1* | 5/2018 | Greve | ........... | C09J 5/06 |

FOREIGN PATENT DOCUMENTS

| | | | | |
|---|---|---|---|---|
| CN | 104449542 A | * | 3/2015 | |
| CN | 106497172 A | | 3/2017 | |
| CN | 107312492 A | * | 11/2017 | ............. C09J 11/04 |
| CN | 107849165 A | * | 3/2018 | ........... C07C 49/213 |
| CN | 111263777 A | * | 6/2020 | ............... C08F 2/44 |
| JP | 3484985 B2 | * | 1/2004 | |
| JP | 3797628 B2 | * | 7/2006 | |
| JP | 2015520787 | | 7/2015 | |
| JP | 2017101112 A | * | 6/2017 | ............... C08F 2/38 |
| JP | 6537465 B2 | * | 7/2019 | |
| JP | 2019189700 A | * | 10/2019 | |
| KR | 2002-0063240 A | | 8/2002 | |
| KR | 2009-0132548 A | | 12/2009 | |
| KR | 2014-0065414 A | | 5/2014 | |
| KR | 2015-0086080 A | | 7/2015 | |
| TW | 201307506 A | * | 2/2013 | ........ C08F 222/1006 |
| WO | WO-02100966 A1 | * | 12/2002 | ............ C08F 290/14 |
| WO | WO-2009086492 A1 | * | 7/2009 | ................ C09J 4/00 |
| WO | WO-2014028024 A1 | * | 2/2014 | ............ C09J 175/16 |
| WO | WO-2014203779 A1 | * | 12/2014 | ............. C08G 75/04 |

(Continued)

OTHER PUBLICATIONS

International Patent Application No. PCT/KR2019/017129; Int'l Written Opinion and Search Report; dated Sep. 1, 2020; 7 pages.
Lee, Jong-Gyu; "Curing Behavior and Characterization of Dual Curable Adhesives Based on Azo-initiator with High Reactivity for Touch Screen Panel in Display"; Program in Environmental Material Science; Seoul National University; Thesis; Aug. 2015; 140 pages.
International Patent Application No. PCT/KR2019/017129; Int'l Preliminary Report on Patentability; dated Jun. 16, 2022; 6 pages.

*Primary Examiner* — Sanza L. McClendon
(74) *Attorney, Agent, or Firm* — Sughrue Mion, PLLC

(57) ABSTRACT

The present invention provides a dual-curable hybrid adhesive composition including a photo-initiator, a thermal initiator, and a thiol group-containing compound, and more particularly, to an adhesive composition which may be cured through a single curing by ultraviolet (UV) light or heat, and where thermal curing proceeds concurrently with UV curing by a heat generated during the UV curing such that even a light shield portion which may not transmit UV light therethrough may be sufficiently cured.

15 Claims, 1 Drawing Sheet

(56) References Cited

FOREIGN PATENT DOCUMENTS

| WO | WO-2016187802 A1 | * 12/2016 | ............. C08G 18/10 |
| WO | WO 2018/227149 A1 | 12/2018 | |

* cited by examiner

<Schematic diagram of simulation evaluation>

DUAL-CURABLE ADHESIVE COMPOSITION

TECHNICAL FIELD

The present invention relates to a dual-curable hybrid adhesive composition including a photo-initiator, a thermal initiator, and a thiol group-containing compound, and more particularly, to an adhesive composition which may be cured through a single curing by ultraviolet (UV) light or heat, and where thermal curing proceeds concurrently with UV curing by a heat generated during the UV curing such that even a light shield portion which may not transmit UV light therethrough may be sufficiently cured.

BACKGROUND ART

Curable adhesives are a material that enables adhesion between objects to be adhered by curing according to specific curing conditions, and may be classified, according to the curing conditions, into a thermo-curable adhesive that may be cured by forming radicals through heating, and a photo-curable adhesive that may be cured by forming radicals through light (e.g., UV) irradiation of a specific wavelength.

Among them, UV curing may have advantages in that curing may be done in a short time and may not be affected by external atmosphere, but has disadvantages in that a light shield portion (shaded area, shady area) through which UV light may not be transmitted may not be cured. On the other hand, thermal curing may have advantages in that the light shield portion may be cured, but has disadvantages in that it may take a long time to complete the curing and may be affected by external atmosphere such as oxygen and temperature.

In order to address the above problems, recently, a dual-curable hybrid composition that may be cured by UV-heat, TV-moisture, and UV-anaerobic methods is being developed. Such a dual-curable hybrid composition should include a photo-curable resin (e.g., UV-curable acrylate) and a thermo-curable resin (e.g., thermo-curable epoxy resin), and curing may be only done sufficiently by performing both heat curing and photocuring to provide satisfactory adhesion, thus leading to a problem that the curing process is complicated and takes a long time. In addition, it has problems such as having to build two or more types of curing facilities.

DETAILED DESCRIPTION OF THE INVENTION

Technical Objectives

The present invention has been devised to solve the above problems, and is directed to providing a dual-curable adhesive composition including a photo-initiator, a thermal initiator, and a thiol (—SH) group-containing compound at a predetermined ratio, which may be cured by each of photo (UV) curing, thermal curing, or light-thermal hybrid curing, and where even a light shield portion (shaded area) may be sufficiently cured only by photocuring without building two or more curing facilities.

Technical Solution to the Problem

In order to achieve the above-described technical objectives, a dual-curable adhesive composition includes: at least one type of photo-curable compound; a photo-initiator; a thermal initiator; and a thiol group-containing compound, wherein a mixing ratio of the photo-initiator, the thermal initiator, and the thiol group-containing compound is in a range of 1:1 to 5:10 to 100 by weight.

According to an embodiment, in the dual-curable adhesive composition, a single curing may be performed by light or heat, or a thermal curing may proceed concurrently with a photocuring due to a heat generated during the photocuring.

According to an embodiment, the thiol group-containing compound may be selected from the group consisting of a primary thiol, a secondary thiol and a tertiary thiol includes at least one thiol group (—SH) in a molecule.

According to an embodiment, the thiol group-containing compound may be a primary thiol includes two or more thiol groups.

According to an embodiment, the at least one type of photo-curable compound may include: a (meth)acrylate oligomer; a monofunctional (meth)acrylate monomer; and a bifunctional or more multifunctional (meth)acrylate monomer.

According to an embodiment, the (meth)acrylate oligomer may be a urethane (meth)acrylate oligomer having a viscosity in a range of 2,000 to 20,000 cps (25° C.), a glass transition temperature (Tg) in a range of -70 to 10° C., and a weight average molecular weight (Mw) in a range of 2,000 to 20,000 g/mol.

According to an embodiment, a number of polymerizable functional groups included in the multifunctional (meth)acrylate monomer may be in a range of 2 to 6.

According to an embodiment, a mixing ratio of the monofunctional (meth)acrylate monomer and the multifunctional (meth)acrylate monomer may be in a range of 1:0.1 to 1 by weight.

According to an embodiment, the photo-initiator may be a compound having an absorption wavelength in a region in a range of 200 nm to 400 nm.

According to an embodiment, the thermal initiator may have a curing initiation temperature of 35° C. or higher.

According to an embodiment, the dual-curable adhesive composition may include, with respect to the total weight of the composition: 10 to 50 parts by weight of a (meth)acrylate oligomer; 3 to 40 parts by weight of a bifunctional or more multifunctional (meth)acrylate monomer; 10 to 60 parts by weight of a monofunctional (meth)acrylate monomer; 0.05 to 2 parts by weight of the photo-initiator; 0.05 to 1.5 parts by weight of the thermal initiator; and 2 to 20 parts by weight of the thiol (—SH) group-containing compound.

According to an embodiment, the composition may further include 10 to 40 parts by weight of an adhesion promoter.

According to an embodiment, the composition further may include at least one of a hydroxy group-containing (meth)acrylate monomer; and a polymerization inhibitor.

According to an embodiment, the dual-curable adhesive composition may have: a viscosity in a range of 100 to 10,000 cps (25° C.), room temperature (25° C.) storage stability for 2 days or more, and low-temperature (-20 to 0° C.) storage stability for 4 months or more.

According to an embodiment, the dual-curable adhesive composition may be used for an optical member including a light shield portion.

According to an embodiment, a thickness of the adhesive composition may be 200±30 μm, and when irradiated for 10 seconds under conditions of a wavelength of 385 nm and an accumulated light amount of 5,000 mJ/cm², a curing length ratio ($L_R$) of a light shield portion represented by the following Equation 1 may be 50% or more compared to an adhesive composition not including the thiol group-containing compound:

$$L_R=(L_2-L_1)/L_1\times 100 \quad \text{[Equation 1]}$$

wherein in the above Equation, $L_2$ is an adhesive composition includes at least one type of photo-curable compound, a photo-initiator, a thermal initiator and a thiol group-containing compound, and $L_1$ is an adhesive composition includes at least one type of photo-curable compound, a photo-initiator and a thermal initiator.

Effects of the Invention

According to an embodiment of the present invention, by including a photo-initiator, a thermal initiator, and a thiol group-containing compound at a predetermined ratio, not only a single curing by ultraviolet (UV) or heat may proceed, but also thermal curing may proceed concurrently by a heat generated during UV curing such that even a light shield portion which may not transmit UV light therethrough may be sufficiently cured, such that excellent curability and adhesive strength may be continuously exhibited.

In addition, in the present invention, even when thermal curing or photocuring is performed alone without mixing two or more types of photo-curable resins and thermal curing resins or building two or more types of curing equipment, it may be possible to provide an adhesive force through sufficient curing, and a long-term adhesion durability may be secured after curing.

In addition, in the present invention, by controlling a content of the thermal initiator, it may be possible to minimize the problems caused by the use of an excessive amount of the thermal initiator and to exhibit excellent storage stability.

Effects according to the present invention are not limited by the descriptions exemplified above, and more various effects are included in the present specification.

MODES FOR IMPLEMENTATION OF THE INVENTION

Figure 1:
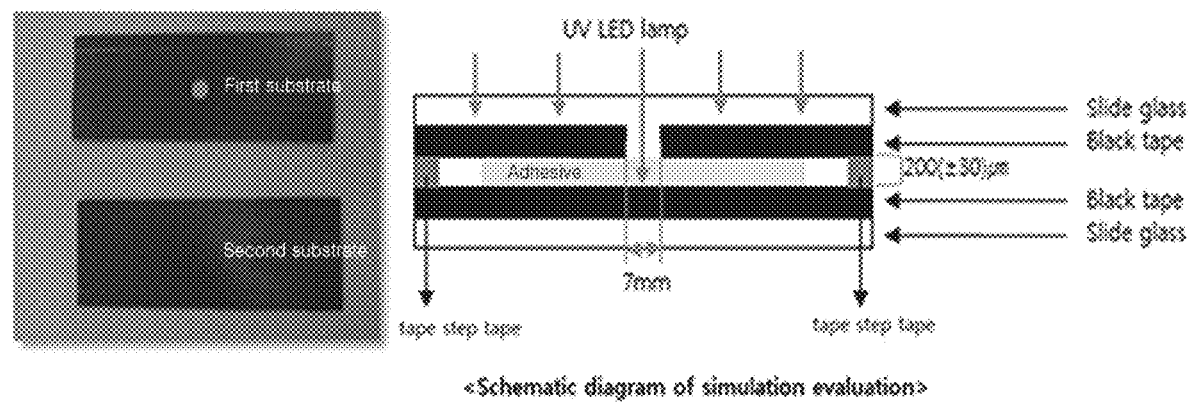
FIG. 1 is a schematic diagram illustrating an evaluation method for measuring a curing length of a light shield portion using an adhesive composition according to the present invention.

Hereinafter, the present invention will be described in detail.

All terms (including technical and scientific terms) as used herein may be used in the meaning commonly understood by those of ordinary skill in the art to which the present invention pertains, unless otherwise defined. In addition, terms defined in a commonly used dictionary are not to be interpreted ideally or excessively unless clearly defined in particular.

In addition, throughout this specification, when a part "includes" a certain component, it means that other components may be further included, rather than excluding other components, unless otherwise stated. In addition, throughout the specification, "above" or "on" means not only when it is located above or below the target part, but also includes the case where there is another part in the middle, and the direction of gravity does not necessarily mean that it is positioned above with respect to the gravity direction.

In addition, as used herein, "(meth)acrylate" represents acrylate and methacrylate, "(meth)acryl" represents acryl and methacryl, and "(meth)acryloyl" represents acryloyl and methacryloyl.

In addition, as used herein, "monomeric product" and "monomer" have the same meaning. The monomer in the present invention is distinguished from an oligomer, a polymer, and a resin, and refers to a compound having a weight average molecular weight of 1,000 g/mol or less. As used herein, "polymerizable functional group" refers to a group involved in a polymerization reaction, for example, a (meth)acrylate group. Further, "polyol" or variations thereof broadly refers to a substance having an average value of two or more hydroxy groups per molecule.

<Dual-Curable Adhesive Composition>

An adhesive composition according to the present invention may be a dual-curable adhesive composition which may be cured by a single curing by light or heat; or may be dual-cured by photocuring (first)-thermal curing (second), or thermal curing (primary)-photocuring (second), and in particular, without additional heating, a thermal curing (e.g., heat curing) may proceed concurrently with a photocuring (e.g., light curing) due to a heat generated during the photocuring.

In an embodiment, the adhesive composition includes at least one type of photo-curable compound; a photo-initiator; a thermal initiator; and a thiol group-containing compound, where the photo-initiator, the thermal initiator, and the thiol group-containing compound are configured at a predetermined mixing ratio. If necessary, it may further include at least one or more conventional additives in the art including an adhesion promoter.

Hereinafter, a composition of the adhesive composition will be described in detail.

Photo-Curable Compound

The adhesive composition according to the present invention includes at least one type of conventional photo-curable compound known in the art as a compound that polymerizes by light of a specific wavelength, for example, ultraviolet (UV) light.

As an example, the at least one type of photo-curable compound may be a (meth)acrylate oligomer; a monofunctional (meth)acrylate monomer; and a bifunctional or more multifunctional (meth)acrylate monomer.

The (meth)acrylate oligomer is a functionalized oligomer or polymer in which a photopolymerizable functional group [e.g., (meth)acrylate group] reactive to UV light irradiation is present in its molecular chain. Such a (meth)acrylate group may be located at an end of the oligomer or polymer chain, or may be distributed along the polymer chain. The number of polymerizable functional groups curable by light irradiation may be in a range of 1 to 6, and an average degree of functionality may be in a range of 1 to 3. As used herein, the average degree of functionality refers to the number of (meth)acrylate groups per molecular chain. Preferably, it may be a urethane (meth)acrylate oligomer.

The urethane (meth)acrylate oligomer may be obtained by reacting a polyol, a diisocyanate, and an acrylate compound as known in the art. Specifically, a urethane prepolymer having isocyanate groups at opposite ends is formed by reacting a polyol with an aromatic diisocyanate, and then the urethane prepolymer is reacted with an acrylate compound having a hydroxy group, and accordingly, a urethane acrylate having acrylate groups at opposite ends [e.g., (meth)acrylate-isocyanate-polyol-isocyanate-(meth)acrylate] may be obtained.

As the polyol, a conventional polyol compound known in the art may be used without limitation. Non-limiting examples of applicable polyols may include, for example, polyether polyol, polyester polyol, polycaprolactone polyol, polytetramethylene ether diol, polybutadiene diol, polytetra methylene ether diol, polypropylene oxide diol, polybutyleneoxide diol, triol, or a mixture thereof. Preferably, it may be a polyether polyol. Such a polyether-based polyol, as compared to the polyester-based polyol, may increase a water resistance of an adhesive, and may improve workability by lowering a viscosity of the adhesive composition. Examples of applicable polyether polyols may include, for example, polybutadiene diol, polytetramethylene ether glycol, polypropylene oxide glycol, polypropylene oxide triol, polybutylene oxide glycol, polybutylene oxide triol, polyoxypropylene glycol, and the like. The above-mentioned components may be used alone or in combination of two or more thereof.

Diisocyanate is a substance that reacts with the polyol to form a prepolymer. As the diisocyanate, diisocyanates known in the art may be used without limitation, and specifically, an aromatic diisocyanate may be used. Such aromatic diisocyanates, as compared to alicyclic diisocyanates, may increase an adhesive force of the adhesive composition. Examples of applicable diisocyanates may include, for example, toluene diisocyanate (TDI), diphenylmethane diisocyanate (MDI), p-phenylene diisocyanate, 4,4'-diphenylmethane diisocyanate, or a mixture thereof.

In addition, the acrylate compound including a hydroxy group is for introducing an acrylate group reactive to the urethane prepolymer, and for example, hydroxyethyl acrylate, hydroxymethyl acrylate, or the like may be used.

As an embodiment of the present invention, the (meth)acrylate oligomer may be a urethane (meth)acrylate oligomer having a viscosity in a range of 2,000 to 20,000 cps (25° C.), a glass transition temperature (Tg) in a range of −70 to 10° C., and a weight average molecular weight (Mw) in a range of 2,000 to 20,000 g/mol.

When the molecular weight of the urethane (meth)acrylate oligomer is too small, it is difficult to achieve an effect of improving impact resistance, and when the molecular weight of the urethane (meth)acrylate oligomer is too large, an adhesive force may be lowered. Specifically, the weight average molecular weight (Mw) of the urethane (meth)acrylate oligomer may be in a range of about 2,000 to 20,000 g/mol, specifically in a range of 3,000 to 6,000 g/mol, and more specifically in a range of 4,000 to 5,000 g/mol.

In addition, the glass transition temperature (Tg) of the urethane (meth)acrylate oligomer may be in a range of −70 to 10° C., specifically in a range of −50 to 0° C. In addition, the viscosity of the urethane (meth)acrylate oligomer may be in a range of 2,000 to 20,000 cps (25° C.), specifically in a range of 3,000 to 10,000 cps, and more specifically, in a range of 5,000 to 6,000 cps.

In the present invention, a content of the urethane (meth)acrylate oligomer is not particularly limited and determined depending on amounts of other components used to form the adhesive composition and desired properties of the adhesive composition. For example, it may be in a range of 10 to 50 parts by weight, specifically in a range of 15 to 40 parts by weight, with respect to the total weight (e.g., 100 parts by weight) of the adhesive composition. When the content of the urethane (meth)acrylate oligomer is within the above-mentioned range, a photopolymerization reaction may be sufficiently performed without degradation of physical properties.

In the present invention, in addition to the (meth)acrylate oligomer (photopolymerizable oligomer) described above, at least one type of photopolymerizable monomer may be mixed. The photopolymerizable monomer controls an overall crosslinking density of the adhesive composition to realize the structure and various physical properties of the adhesive. In addition, flexibility and adhesion and stickiness to other materials may be improved.

In general, the (meth)acrylate monomer may be classified, according to the number of polymerizable functional groups, e.g., (meth)acrylate groups, included in one molecule, into a monofunctional acrylic monomer (f=1), a bifunctional acrylic monomer (f=2), a trifunctional acrylate monomer (f=3), and a multifunctional acrylate monomer more than tetrafunctionality (f≥4). In the present invention, at least one type of (meth)acrylate monomer is used as the photopolymerizable monomer, but a monofunctional (meth)acrylate monomer; and a bifunctional or more multifunctional (meth)acrylate monomer are mixed.

Herein, both of the monofunctional (meth)acrylate monomer and the multifunctional (meth)acrylate monomer contribute to forming a crosslinked structure through photocuring. In particular, the multifunctional (meth)acrylate monomer containing at least two or more polymerizable functional groups may form a more dense and tight three-dimensional network crosslinking structure due to a number of functional groups included in a molecule, thereby improving a crosslink density of the matrix and a glass transition temperature (Tg). Considering the above-described physical properties, a mixing ratio of the monofunctional (meth)acrylate monomer and the multifunctional (meth)acrylate monomer may be in a range of 1:0.1 to 1.0 by weight, and specifically in a range of 1:0.2 to 0.6 by weight.

As the monofunctional (meth)acrylate monomer, a known (meth)acrylate monomer containing one photopolymerizable unsaturated group in a molecule may be used without limitation. Examples of applicable monofunctional (meth)acrylate monomers may include, for example, isobornyl (meth)acrylate, tetrahydrofurfuryl (meth)acrylate, alkoxylated tetrahydrofurfuryl (meth)acrylate, and a mixture thereof.

For example, the weight average molecular weight (Mw) of the monofunctional (meth)acrylate monomer may be 100 g/mol or more, and more specifically, in a range of 100 to 1,000 g/mol.

In the present invention, the content of the monofunctional (meth)acrylate monomer may be appropriately adjusted within a range known in the art in consideration of the structure and physical properties of the adhesive. For example, it may be in a range of 10 to 60 parts by weight, specifically in a range of 20 to 50 parts by weight, with respect to the total weight (e.g., 100 parts by weight) of the adhesive composition.

In addition, as the multifunctional (meth)acrylate monomer, a known (meth)acrylate monomer containing two or more, specifically, two to six, polymerizable functional groups (polymerizable unsaturated groups) in a molecule may be used without limitation. For example, at least one of a bifunctional (meth)acrylate monomer; a trifunctional (meth)acrylate monomer; a tetrafunctional (meth)acrylate monomer; a pentafunctional (meth)acrylate monomer; and a hexafunctional (meth)acrylate monomer may be included.

For example, a weight average molecular weight (Mw) of the multifunctional (meth)acrylate monomer may be 200 g/mol or more, a glass transition temperature (Tg) may be −40° C. or more, and more specifically, the weight average molecular weight (Mw) may be in a range of 200 to 1,000 g/mol, and the glass transition temperature (Tg) may be in a range of 40 to 80° C.

Non-limiting examples of applicable bifunctional (meth)acrylate monomer may include, for example, ethylene glycol di(meth)acrylate, propylene glycol di(meth)acrylate, polyolefin glycol di(meth)acrylate, ethoxylated polypropylene glycol di(meth)acrylate, 2-hydroxy-3-acryloyloxypropyl methacrylate, 2-hydroxy-1,3-dimethacryloxypropane, dioxane glycol di(meth)acrylate, tricyclodecanedimethanol di(meth)acrylate, 1,4-butanediol di(meth)acrylate, glycerin di(meth)acrylate, 1,6-hexanediol di(meth)acrylate, 1,9-nonanediol di(meth)acrylate, 1,10-decanediol di(meth)acrylate, neopentylglycol di(meth)acrylate, 2-methyl-1,8-octanediol di(meth)acrylate, 1,9-nonanediol di(meth)acrylate, butylethylpropanediol di(meth)acrylate, 3-methyl-1,5-pentanediol di(meth)acrylate, and di(meth)acrylate having an aromatic ring, for example, ethoxylated bisphenol A di(meth)acrylate, propoxylated ethoxylated bisphenol A di(meth)acrylate, and ethoxylated bisphenol F di(meth)acrylate.

Non-limiting examples of applicable trifunctional (meth)acrylate monomers may include, for example, ethoxylated glycerin tri(meth)acrylate, trimethylolpropane tri(meth)acrylate, ethoxylated trimethylolpropane tri(meth)acrylate, and propoxylated trimethylolpropane tri(meth)acrylate and pentaerythritol tri(meth)acrylate.

Non-limiting examples of applicable tetrafunctional (meth)acrylate monomers may include, for example, pentaerythritol tetra(meth)acrylate, ditrimethylolpropane tetra(meth)acrylate, ethoxylated pentaerythritol tetra(meth)acrylate (tetrafunctional monomer) or a mixture thereof.

In addition, non-limiting examples of applicable pentafunctional (meth)acrylate monomer may include, for example, dipentaerythritol pentaacrylate, propionic acid-modified dipentaerythritol pentaacrylate, dipentaerythritol pentamethacrylate, propionic acid-modified dipentaerythritol pentamethacrylate or a mixture thereof.

In addition, non-limiting examples of the hexafunctional (meth)acrylate monomer may include, for example, dipentaerythritol hexaacrylate, caprolactone-modified dipentaerythritol hexaacrylate, dipentaerythritol hexamethacrylate, caprolactone-modified dipentaerythritol hexamethacrylate, or a mixture thereof. The above-mentioned components may be used alone or in combination of two or more thereof.

In the present invention, a content of the multifunctional (meth)acrylate monomer may be appropriately adjusted within a range known in the art in consideration of the structure and physical properties of the adhesive. For example, it may be in a range of 3 to 40 parts by weight, specifically in a range of 5 to 30 parts by weight, with respect to the total weight (e.g., 100 parts by weight) of the adhesive composition. When the content of the multifunctional (meth)acrylic monomer is within the above range, the crosslinking structure and density of the cured adhesive may be improved by appropriately adjusting the viscosity and crosslinking density of the adhesive composition, and the glass transition temperature (Tg) may be improved.

Photo-Initiator

In the adhesive composition according to the present invention, the photo-initiator is a component that is excited by a light source having a predetermined wavelength region to initiate photopolymerization, and conventional photo-initiators known in the art may be used without limitation.

Specifically, the photo-initiator may include both of an ultraviolet (UV) photo-initiator and a visible light photo-initiator, and preferably, a UV photo-initiator may be used.

The UV photo-initiator may use a compound generally having an absorption wavelength at a wavelength in a range of 200 to 400 nm, and specifically, a compound having an absorption wavelength in a portion of a spectrum adjacent to invisible light and a portion of visible light slightly outside this spectrum, for example, in a range of greater than 200 nm to about 390 nm may be effective. Examples of applicable photo-initiators may include, for example, acetophenone-based compound, benzophenone-based compound, thioxanthone-based compound, benzoin-based compound, triazine-based compound, oxime-based compound, benzyldimethyl-ketal, hydroxyketone (α-hydroxyketone), aminoketone (α-aminoketone), phenylglyoxylate, monoacyl phosphine, bis acryl phosphine, or a mixture thereof.

Non-limiting examples of applicable photo-initiators may include, for example, Irgacure 184, Irgacure 369, Irgacure 651, Irgacure 819, Irgacure 907, benzionalkylether, benzophenone, benzyl dimethyl katal, hydroxycyclohexyl phenylacetone, chloroacetophenone, 1,1-dichloro acetophenone, diethoxy acetophenone, hydroxy acetophenone, diethoxy acetophenone, 2-chlorothioxanthone, 2-ethylanthraquinone (2-ETAQ), 1-Hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, and the like. These may be used alone or in combination of two or more thereof.

In the present invention, the photo-initiator may be freely selected according to a UV or LED lamp to be used. Specifically, in consideration of a 365 to 385 nm LED lamp curing system, phenylbis(2,4,6-trimethylbenzoyl)phosphine oxide (Iragcure 819 or Darocure 819) from among BAPO-type photo-initiators, diphenyl (2,4,6-trimethylbenzoyl)-phosphine oxide (DAROCUR TPO) from among mono acryl phosphine may be preferably used.

In the present invention, a content of the photo-initiator is not particularly limited, and may be appropriately adjusted within a range known in the art. For example, it may be in a range of 0.05 to 2 parts by weight, and specifically in a range of 0.05 to 1.0 parts by weight, with respect to the total weight of the adhesive composition. When the content of the photo-initiator is within the above-mentioned range, the photopolymerization reaction may be sufficiently performed without degradation of physical properties.

Thermal Initiator

In the adhesive composition according to the present invention, the thermal initiator is a substance serving to initiate thermal polymerization by a predetermined heat, and conventional thermal polymerization initiators known in the art may be used without limitation.

The thermal initiator may be a compound having a curing initiation temperature of 35° C. or higher, and specifically, a curing initiation temperature may be in a range of 35 to 100° C., and more specifically, in a range of 35 to 80° C. When a thermal initiator having the above-described curing initiation temperature is used, during photocuring by UV irradiation, thermal curing may proceed concurrently with the photocuring due to a heat generated during the photocuring. Accordingly, without additional heating, the curing reaction of the adhesive may be sufficiently performed even for a light shield portion (shaded area, shady area) through which ultraviolet rays may not pass (e.g., may not be transmitted).

Examples of applicable thermal initiators may include, for example, azo compounds, peroxides, hydrazides, imidazoles, and/or other thermal initiator(s) capable of releasing radicals under heating conditions, and combinations thereof. Examples thereof may include, for example, azonitrile, azo ester, azo amide, organic peroxide, inorganic peroxide, or a mixture thereof.

When an excessive amount of thermal initiator is used, problems in terms of storage stability of the adhesive composition may occur. Accordingly, in the present invention, in consideration of the thermal curing reaction and the storage stability of the composition, the amount of the thermal initiator is adjusted within a predetermined range to be optimized. Accordingly, the amount of the thermal initiator used according to the present invention may be in a range of 0.05 to 1.5 parts by weight, and preferably in a range of 0.1 to 1.0 parts by weight, with respect to the total weight (e.g., 100 parts by weight) of the adhesive composition. When the content of the thermal initiator is within the aforementioned range, the thermal polymerization reaction may be sufficiently performed without degradation of storage stability of the composition.

Thiol Group-Containing Compound

The adhesive composition according to the present invention includes a thiol group-containing compound in addition to the photo-initiator and the thermal initiator described above.

As the thiol group-containing compound, a compound known in the art including at least one thiol group (—SH) in a molecule may be used without limitation. In such an embodiment, the number of thiol groups is not particularly limited, and it may include 2 to 10 thiol groups (—SH) depending on the structure thereof. Specifically, the thiol group-containing compound may be a primary thiol, a secondary thiol, a tertiary thiol, or a mixture thereof, and a hydrocarbon group included in the primary to tertiary thiol may be selected from conventional aliphatic thiols, alicyclic thiols, aromatic thiols, or a combination thereof known in the art. In consideration of a reaction rate during thermal curing, the thiol group-containing compound may preferably be a primary thiol containing two or more, specifically, two to four thiol groups (—SH).

As an example, the thiol group-containing compound may have a weight average molecular weight (Mw) of 150 g/mol or more, specifically in a range of 200 to 350 g/mol, and a viscosity in a range of 10 to 100 cps (25° C.), specifically in a range of 10 to 20 cps.

Non-limiting examples of applicable thiol group-containing compounds may include, for example, pentaerythritol tetrakis(3-mercaptopropionate), trimethylolpropane tris(3-mercaptopropionate), pentaerythritol tetrakis(mercaptoacetate), trimethylolpropane tris(2-mercaptoacetate), glycol di-3-mercaptopropionate, ethylene glycol bis(3-mercaptopropionate), or a mixture thereof.

In the present invention, an amount of the thiol group-containing compound used may be in a range of 2 to 20 parts by weight, specifically in a range of 5 to 15 parts by weight, with respect to the total weight (e.g., 100 parts by weight) of the adhesive composition. When the content of the thiol group-containing compound is within the above-described range, the thermal curing reaction may be sufficiently performed without degradation of physical properties.

Adhesion Promoter

The adhesive composition according to the present invention may further include a conventional adhesion promoter known in the art.

The adhesion promoter may be a material (tackifier) added to improve initial adhesion between objects to be bonded or to improve adhesion durability after curing, and any adhesion promoter or tackiness promoter known in the art may be used without limitation.

Examples of applicable adhesion promoters may include, for example, petroleum resin, alkylphenol resin, alkylphenol formaldehyde resin, rosin, rosin ester resin, coumaronindine resin, beta-(3,4-epoxycyclohexyl)ethyltrimethoxysilane, gamma-glycidoxypropyltrimethoxysilane, gamma-aminopropyltriethoxysilane, N-beta-(aminoethyl)-gamma-aminopropyltrimethoxysilane, and the like. The above-mentioned components may be used alone or in combination of two or more thereof. Specifically, it may be preferable to use a hydrogenated rosin ester, a terpene resin, or a hydrocarbonated resin from among rosin ester resins.

In the present invention, an amount of the adhesion promoter used is not particularly limited, and may be in a range of 10 to 40 parts by weight, and specifically in a range of 20 to 30 parts by weight, with respect to the total weight (e.g., 100 parts by weight) of the adhesive composition.

Additive

In addition to the above components, the adhesive composition of the present invention may use at least one additive known in the art without limitation within the range that does not impair the effects of the present invention.

Examples of applicable additives may include, for example, a light stabilizer, a heat stabilizer, a photo-initiation accelerator, a thermal initiation accelerator, a smoothing agent (e.g., leveler), a toughening agent, a thickener, a solvent, and the like. These may be used alone or in combination of two or more thereof. In such an embodiment, a content of the additive may be appropriately adjusted within a range known in the art and is not particularly limited. For example, the at least one type of additive may be included in an amount in a range of 0.01 to 5 parts by weight, and specifically 0.01 to 2 parts by weight, with respect to the total weight of the adhesive composition.

The dual-curable adhesive composition according to the present invention may be prepared by mixing and stirring the above-described photopolymerizable oligomer, photopolymerizable monomer, photo-initiator, thermal initiator, thiol group-containing compound, and other additives or solvents blended as necessary, according to conventional methods known in the art.

As an example, the adhesive composition may include, with respect to the total weight of the composition, 10 to 50 parts by weight of the (meth)acrylate oligomer; 3 to 40 parts by weight of the bifunctional or more multifunctional (meth)acrylate monomer; 10 to 60 parts by weight of the monofunctional (meth)acrylate monomer; 0.05 to 2 parts by weight of the photo-initiator; 0.05 to 1.5 parts by weight of the thermal initiator; and 2 to 20 parts by weight of the thiol (—SH) group-containing compound, and may include, if necessary, 10 to 40 parts by weight of the adhesion promoter and/or a residual amount of the solvent satisfying 100 parts by weight in total.

The adhesive composition of the present invention described above may have a viscosity at 25° C. in a range of 100 to 10,000 cps, and specifically 200 to 2,000 cps. By adjusting the viscosity to an appropriate range, excellent workability and processability may be imparted.

Meanwhile, a conventional thermocurable adhesive composition or a dual-curable hybrid adhesive composition (e.g., UV+heat, heat+UV) is typically stored at a low temperature (0° C.), and is actually used at room temperature (25° C.).

On the other hand, the adhesive composition of the present invention may have a storage stability of 2 days or more, specifically, 10 days or more, at room temperature (with respect to 25° C.), and may have a storage stability of 4 months or more at a low temperature (−20 to 0° C.).

In such a case, since the curing initiation temperature of the thermal initiator included in the adhesive composition of the present invention is 35° C. or higher, the initiation reaction of the thermal initiator proceeds slowly at 35° C., and when an ambient temperature actually used becomes 35° C. from 25° C., it may cause a problem that the composition is completely cured within 15 to 24 hours and becomes unapplicable. Accordingly, the storage stability the adhesive composition of the present invention in the curing initiation temperature (e.g., 35° C.) range may be insufficient.

In order to improve the storage stability in the above-mentioned curing initiation temperature range, the adhesive composition of the present invention may further include at least one of a conventional hydroxy group-containing (meth) acrylate monomer known in the art; and a polymerization inhibitor.

The hydroxy group-containing (meth)acrylate monomer may use a conventional monomer known in the art including both of a reactive photopolymerizable functional group [e.g., a (meth)acrylate group] and a hydroxy group in a molecule without limitation. For example, hydroxy ethyl acrylate (HEA), hydroxy methyl acrylate (HEMA), hydroxy propyl (meth)acrylate (HPMA), a mixture thereof, and the like may be used.

In the present invention, an amount of the hydroxy group-containing (meth)acrylate monomer used is not particularly limited, and may be in a range of 0.5 to 3 parts by weight, specifically in a range of 0.5 to 1 part by weight, with respect to the total weight (e.g., 100 parts by weight) of the adhesive composition.

In addition, polymerization inhibitors known in the art may be used without limitation. Non-limiting examples of applicable polymerization inhibitors may include, for example, hydroquinone, toluhydroquinone, methylhydroquinone, para t-butylcatechol, phenolthiazine, chloranil, triphenylphosphine, or a mixture thereof. Specific examples of the polymerization inhibitors may include, for example, hydroquinone (HQ), hydroquinone monomethyl ether (MEHQ), hydroquinone monoethyl ether (EEHQ), butylated hydroxy toluene (BHT) or a mixture thereof.

In such a case, as the use amount of polymerization inhibitor increases, the storage stability at 35° C. may be improved, but thermal curing behavior may become slow, which may affect a curing length of the light shield portion. Accordingly, the use amount of the polymerization inhibitor according to the present invention may be in a range of 10 to 100 ppm by weight, and specifically, may be adjusted within a range of 30 to 60 ppm, with respect to the total weight (e.g., 100 parts by weight) of the adhesive composition.

The adhesive composition of the present invention constituted as described above may be cured by a single curing by light or heat; or alternatively, may be dual-cured by photocuring (first)-thermal curing (second), thermal curing (first)-photocuring (second), and in particular, it may be usefully applied as a dual-curable-type adhesive where without additional heating, thermal curing may proceed concurrently with photocuring due to a heat generated in the photocuring.

Specifically, the adhesive composition of the present invention has excellent curing performance not only when a metal halide lamp is used as a light source but also when a UV-LED is used as a light source, and accordingly, without an additional curing process (e.g., heating) for an optical base including a light shield portion, a resin composition in the light shielded area may be sufficiently cured by mere irradiation of ultraviolet light, and thus it may be usefully used as an adhesive. Accordingly, the adhesive composition may be used for an optical member including a light shield portion to secure more excellent reliability. In the present invention, it may be appreciated that synergistic effects may be exhibited in terms of reliability of an optical member including a light shield portion through improvement effects of a curing rate, a curing time, and a curing length of the light shield portion of the adhesive composition to be described below (see Tables 2 and 3 below).

As an example of the present invention, in a case where a thickness of the adhesive composition is 200±30 μm, when irradiated for 10 seconds under conditions of a wavelength of 385 nm and an accumulated light amount of 5,000 mJ/cm², a curing length ratio ($L_R$) of the light shield portion represented by the following equation 1 may be 50% or more, specifically in a range of 50 to 95%, and more specifically in a range of 60 to 90%, as compared to an adhesive composition not including the thiol group-containing compound.

$$L_R = (L_2 - L_1)/L_1 \times 100 \qquad \text{[Equation 1]}$$

In the above formula, $L_2$ is an adhesive composition including at least one type of photo-curable compound, a photo-initiator, a thermal initiator and a thiol group-containing compound, and $L_1$ is an adhesive composition including at least one type of photo-curable compound, a photo-initiator and a thermal initiator.

As another example, in a case where a thickness of the adhesive composition is 200±30 μm, when irradiated for 10 seconds under conditions of a wavelength of 385 nm and an accumulated light amount of 5,000 mJ/cm², a curing length of the light shield portion may be 1.5 mm or more, specifically in a range of 1.5 to 3.0 mm, and more specifically, in a range of 1.7 to 2.5 mm.

In addition, the adhesive composition of the present invention may form a more dense and tight three-dimensional network crosslinked structure by mixing the photo-initiator, the thermal initiator, and the thiol group-containing compound, while configuring an adhesive matrix by mixing a photopolymerizable oligomer, a monofunctional (meth) acrylate monomer, and a multifunctional (meth)acrylate monomer.

As another example of the present invention, a specific gravity of a liquid of the adhesive may be in a range of 0.8 to 1.3, and specifically in a range of 1.0 to 1.1. In addition, a specific gravity of a solid of the adhesive may be in a range of 0.8 to 1.4, and specifically in a range of 1.0 to 1.2.

Furthermore, as used herein, the optical member includes both of an optical member which does not include a light shield portion on a surface thereof, and an optical member which includes a light shield portion on a surface thereof. In the optical member including the light shield portion on the surface, the light shield portion may be partially or entirely formed on one surface or opposite surfaces of the optical member. Moreover, it may be preferable that at least a portion of the bonded optical member includes an exposure portion in which the light shield portion is not formed so that the adhesive composition may be UV-cured when the optical member is bonded.

Non-limiting examples of optical members to which the adhesive composition according to the present invention may be applied may include, for example, transparent plates, sheets, touch panels, display members, and the like. In addition, examples of a surface material of the panel may include, for example, glass, PET, PC, PMMA, a composite of PC and PMMA, COC, and COP. However, it is not limited thereto.

In addition, the optical member such as the display panel obtained by using the adhesive composition according to the present invention may be mounted on, for example, electronic devices such as televisions, small-sized game machines, mobile phones and personal computers, and in addition, display panels such as liquid crystal display panels, electrophoretic display panels, or electrowetting display panels, as well as a backlight unit. In addition, as the configuration of the display device, those known in the art may be applied.

Hereinafter, the present invention will be described in detail through embodiments. However, the following embodiments are only provided to illustrate the present invention, and the present invention is not limited by the following embodiments.

Embodiment 1. Preparation of Adhesive Composition

A (meth)acrylate oligomer, a monofunctional (meth)acrylate monomer, a multifunctional (meth)acrylate monomer, a photo-initiator, a thermal initiator, a thiol group-containing compound and an additive are mixed according to a mixing ratio shown in [Table 1] below, respectively, and an adhesive composition of Embodiment 1. (Embod. 1) was prepared. In Table 1 below, the usage unit of each composition is parts by weight.

TABLE 1

| Composition of adhesive composition (parts by weight) | | Embod. 1 | Comp. Ex. 1 | Comp. Ex. 2 | Comp. Ex. 3 |
|---|---|---|---|---|---|
| Photo-Curable \]/ | Uretnane acrylate oligomer (Mw: 4,000~5,000 g/mol, Viscosity: 5,000~6,000 cps (25° C.), Tg: −50~0° C.) | 24.2 | 24.2 | 24.2 | 24.2 |
| | Acrylate monomer (f = 1, Mw: 200~300 g/mon Viscosity: 5-15 cps (25° C.), Tg: 70~100° C.) | 35 | 45 | 35.6 | 45.6 |
| | Acrylate monomer (f = 4, Mw: 200~300 g/mol Viscosity: 300-700 제 (25° C.), Tg: 40~70° C.) | 10 | 10 | 10 | 10 |
| Photo-initiator | BAPO-type photo-initiator | 0.2 | 0.2 | 0.2 | 0.2 |
| Thermal Initiator | Azo-type thermal initiator | 0 6 | 0.6 | — | — |
| Thiol group-containing compound | Primary thiol (SH-f = 2, Mw: 200~350 g/mol Viscosity: 10-20 cps (25° C.) ) | 10 | — | 10 | — |
| Additive | Adhesion Promoter | 20 | 20 | 20 | 20 |
| | Total | 100 | 100 | 100 | 100 |

Comparative Examples 1 to 3

Adhesive compositions of Comparative Examples 1 to 3 (Com. Ex. 1 to 3) were prepared in the same manner as in Embodiment 1, except that the composition was changed as shown in Table 1, respectively.

Experimental Example 1. Evaluation of Curing Properties

By using the adhesive compositions of Embodiment 1 and Comparative Examples 1 to 3, a photocuring, a thermal curing, a dual-curing by light and heat, and a dual-curing by heat and light were respectively performed as follows. The evaluation method of curing of each adhesive composition was performed according to methods of Evaluation 1 to Evaluation 3 below, and the results thereof are shown in Table 2 below.

(1) Evaluation 1 (Photocuring)

Each of the adhesive compositions of Embodiment 1 and Comparative Examples 1 to 3 was applied to a thickness of 200 (±30) μm on one surface of a glass plate, followed by glass to glass lamination, and then irradiated with an LED lamp (385 nm) at 50 mJ/cm$^2$ (50 mw/sec×1 sec) and 200 mJ/cm$^2$ (200 mw/sec×1 sec curing), respectively, and photocured. Then, a curing rate after photocuring was analyzed using FT-IR.

(2) Evaluation 2 (Thermal Curing)

(i) Evaluation 2-1 (thermal curing time): 3 g (about 1.2 mm thickness) of each adhesive composition was put into a 10 ml vial, and then put into an oven set at 70° C. and 100° C., respectively, and a curing (liquid phase→solid phase) time was measured.

(ii) Evaluation 2-2 (thermal curing rate): each adhesive composition was applied to a thickness of 200 (±30) μm on a glass plate, followed by glass to glass lamination, and then put into an oven set at 70° C. and 100° C., respectively, to be thermally cured for 30 minutes. Then, a curing rate after thermal curing was analyzed using FT-IR.

(3) Evaluation 3 [Dual-Curing (Hybrid Curing)]

(i) Evaluation 3-1 (First Photocuring→Second Thermal Curing)

Each adhesive composition was applied to a thickness of 200 (±30) μm on one surface of a glass plate, followed by glass to glass lamination, and then, a first (e.g., primary) photocuring and a second (e.g., secondary) thermal curing were performed sequentially. In such a case, the first photocuring condition was an LED lamp (385 nm) at 50 mJ/cm$^2$ (50 mw/sec×1 sec), and the second thermal curing condition was a heat at 100° C. for 30 minutes. Then, a curing rate was analyzed using FT-IR.

(ii) Evaluation 3-2 (First Thermal Curing→Second Photocuring)

Each adhesive composition was applied to a thickness of 200 (±30) μm on one surface of a glass plate, followed by glass to glass lamination, and then, a first (e.g., primary) thermal curing and a second (e.g., secondary) photocuring were performed sequentially. In such a case, the first photocuring condition was a heat at 100° C. for 4 minutes, and the second thermal curing condition was an LED lamp (385 nm) at 200 mV/cm$^2$ (200 mw/sec×1 sec). Then, a curing rate was analyzed using FT-IR.

TABLE 2

| Evaluation conditions | | | | Embod. 1 | Comp. Ex. 1 | Comp. Ex. 2 | Comp. Ex. 3 |
|---|---|---|---|---|---|---|---|
| Evaluation 1 | 1-1 UV curing | Curing rate (%) | 50 mJ/cm² | 77 | 71 | 70 | 60 |
| | 1-2 | | 200 mJ/cm² | 95 | 81 | 90 | 83 |
| Evaluation 2 | 2-1 Thermal curing | Curing time (min) | 70° C. | 18 | Uncured | Uncured | Uncured |
| | | | 100° C. | 7 | 13 | Uncured | Uncured |
| | 2-2 | Curing rate (%) | 70° C./30 min | 90 | Uncured | Uncured | Uncured |
| | | | 100° C./30 min | 98 | 79 | Uncured | Uncured |
| Evaluation 3 | 3-1 Dual-curing | UV→Heat Curing rate (%) | 1st: UV 50 mJ/cm² | 77 | 71 | 70 | 60 |
| | | | 2nd: 100° C./30 min | 98 | 82 | 74 | 63 |
| | 3-2 | Heat→UV Curing rate (%) | 1st: Heat 100° C./4 min | 81 | Uncured | Uncured | Uncured |
| | | | 2nd: UV 200 J/cm² | 95 | — | — | — |

As shown in the above Table 2, the adhesive compositions of Comparative Examples 1 to 3 that do not include all of the thiol group-containing compound, the thermal initiator, and the photo-initiator had a problem that they are uncured during thermal curing. In particular, in Comparative Example 1 in which the photo-initiator and the thermal initiator were included and a thiol group-containing compound was not included, the uncuring phenomenon occurred during thermal curing, and it may be assumed that the thiol group-containing compound was a major factor affecting the thermal curing reaction.

On the other hand, in the case of the adhesive composition of Embodiment 1 in which all of the thiol group-containing compound, the thermal initiator, and the photo-initiator were included, it was appreciated that the curing reaction occurred sufficiently even when thermal curing or photocuring is applied alone, as well as the case of dual-curing by heat and light (see Table 2).

Experimental Example 2. Evaluation of Curing Length of Light Shield Portion

Using the adhesive compositions of Embodiment 1 and Comparative Examples 1 to 3, the curing length of the light shield portion (shaded area) was measured as follows.

Specifically, as illustrated in FIG. 1, a second substrate in which a UV-light shield portion was formed by blackening (e.g., applying a black tape) an entire surface on one side of a glass plate (75 mm×25 mm×1 mm), and a first substrate in which a UV-light shield portion was formed by blackening (e.g., applying a black tape) an entire surface except a predetermined area (a circular area with a diameter of 7 mm) on one surface of a glass plate were each prepared. In order to apply the adhesive composition to a thickness of 200 (±30) μm, after attaching a step tape to opposite ends of the second substrate, the adhesive compositions obtained in Embodiment 1 and Comparative Examples 1 to 3 were applied in a center portion of the second substrate using a dropping pipette. Then, the first and second substrates were glass-to-glass laminated so that the surfaces of the first and second substrates on which the light shield portion was formed face each other.

Figure 2:
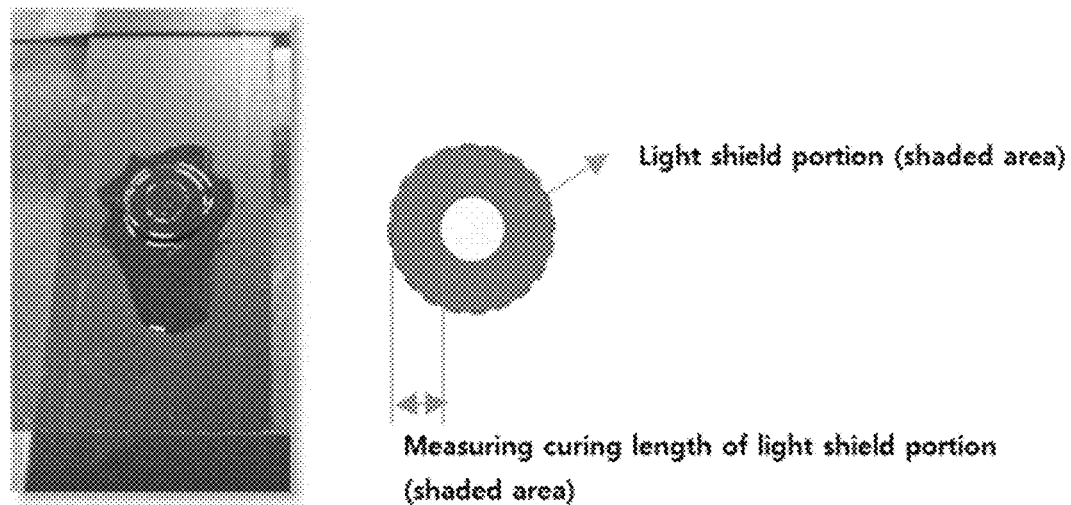
FIG. 2 is a cross-sectional view illustrating a measurement position of a curing distance of a light shield portion measured in an experimental example of the present invention.

Next, the entire surface was irradiated with an ultraviolet (UV) light in a direction of the glass plate of the first substrate. In such an embodiment, a UV-LED (manufactured by Jueun UV Tech, 385 nm wavelength) was used as a light source, and an amount of accumulated light was 5,000 mJ/cm² (500 mw/sec×10 sec). Then, as illustrated in FIG. 2 below, a distance [curing distance of the light shield portion (shaded area)] from one end of the predetermined area (the circular area with a diameter of 7 mm) of the second substrate cured by UV irradiation to where the adhesive composition was cured was measured under a microscope, and the results are shown in Table 3 below.

In such a case, a ratio ($L_R$) of the curing length of the light shield portion in Table 3 was measured by the following [Equation 1].

$$L_R = (L_2 - L_1)/L_1 \times 100 \quad \text{[Equation 1]}$$

In the above Equation, $L_2$ is an adhesive composition including at least one type of photo-curable compound, a photo-initiator, a thermal initiator and a thiol group-containing compound, and $L_1$ is an adhesive composition including at least one type of photo-curable compound, a photo-initiator and a thermal initiator and not including a thiol group-containing compound.

TABLE 3

| Conditions for measuring curing length of light shield portion [385 nm, 5000 mJ/cm²] | Embod. 1 | Comp. Ex. 1 | Comp. Ex. 2 | Comp. Ex. 3 |
|---|---|---|---|---|
| Curing length of light shield portion (mm) | 2.45 | 1.29 | 1.15 | 1.09 |
| Ratio of curing length of light shield portion ($L_R$, %) | 89.9 | 0 | — | — |
| Curing rate of light shield portion (%) | 90-100 | 0 | 0 | 0 |

As shown in Table 3, it was appreciated that in the case of the adhesive composition of Embodiment 1 including all of the thiol group-containing compound, the thermal initiator, and the photo-initiator, the adhesive composition positioned in the light shield area may be sufficiently cured merely with light irradiation (UV). It was appreciated that since thermal curing proceeded concurrently with the photocuring by UV irradiation due to heat generated during the photocuring, and accordingly, without a separate heating process, the curing reaction proceeded sufficiently even for the light shield portion (shaded area) through which ultraviolet rays may not be transmitted.

In view of the above results, it was appreciated that the adhesive composition of the present invention may be applied to each of photocuring, thermal curing, or dual-curing thereof, and since the adhesive composition positioned in the light shield area may be sufficiently cured merely with UV irradiation without a separate heating process, it may be usefully applied as an adhesive for an optical base in which a light shield portion is present.

Experimental Example 3. Storage Stability and Curing Properties Evaluation

Using adhesive compositions of Embodiments 1 to 4, storage stability and curing properties were evaluated as follows, respectively.

Specifically, an evaluation method of each adhesive composition was performed according to the following method, and the results thereof are shown in Table 4 below.
(1) 35° C. Storage Stability Evaluation
120 g of each adhesive composition was put into a 150 ml vial and then put into an oven set at 35° C., and then, a time for curing (liquid→solid) was measured.
(2) Evaluation of Curing Length, Curing Length Ratio and Curing Rate of Light Shield Portion
The evaluation was carried out in the same manner as in Experimental Example 2 described above.

TABLE 4

| Composition | Embod. 1 | Embod. 2 Hydroxy group-containing (meth) acrylate monomer HEA | Embod. 3 Polymerization inhibitor BHT | Embod. 4 Polymerization inhibitor MEHQ |
|---|---|---|---|---|
| Amount added | — | 1 part by weight | 50 ppm | 50 ppm |
| 35° C._Storage stability evaluation (Liquid → Solid) time (hr) | 12-15 | 14-16 | 13-16 | 20-30 |
| Curing length (mm) of light shield portion | 2.45 | 2.41 | 2.31 | 2.25 |
| Ratio ($L_R$, %) of curing length of light shield portion | 89.9 | 89.8 | 79.1 | 74.4 |
| Curing rate of light shield portion (%) | 90-100 | 90-100 | 90-100 | 90-100 |

Conditions for measuring curing length of light shield portion [385 nm, 5000 mJ/cm$^2$]

As shown in the above Table 4, it was appreciated that Embodiments 2 to 4 including all of the thiol group-containing compound, the thermal initiator, and the photo-initiator, and additionally including a hydroxy group-containing (meth)acrylate monomer and/or a polymerization inhibitor, not only exhibited excellent curing properties as compared to Comparative Examples 1 to 3 of Table 3, but also had more excellent 35° C. storage stability as compared to Embodiment 1. In particular, in the case of Embodiment 2, it was appreciated that it exhibited curing properties comparable to that of Embodiment 1, while being improved for about 1 to 4 hours in terms of storage stability at 35° C.

The invention claimed is:

1. A dual-curable adhesive composition comprising:
   at least one type of photo-curable compound;
   a photo-initiator;
   a thermal initiator having a curing initiation temperature of 35° C. or higher; and
   a thiol group-containing compound,
   wherein a mixing ratio of the photo-initiator, the thermal initiator, and the thiol group-containing compound is in a range of 1:1 to 5:10 to 100 by weight,
   wherein the at least one type of photo-curable compound comprises:
      a (meth)acrylate oligomer;
      a monofunctional (meth)acrylate monomer;
      a bifunctional or more multifunctional (meth)acrylate monomer, and,
      a hydroxy group-containing (meth)acrylate monomer, and
   said hydroxy group-containing (meth)acrylate monomer being in a range of 0.5 to 3 parts by weight with respect to a total weight of the adhesive composition.

2. The dual-curable adhesive composition of claim 1, wherein a single curing is performed by light or heat, or a thermal curing proceeds concurrently with a photo-curing due to a heat generated during the photocuring.

3. The dual-curable adhesive composition of claim 1, wherein the thiol group-containing compound is selected from the group consisting of a primary thiol, a secondary thiol and a tertiary thiol comprising at least one thiol group (—SH) in a molecule.

4. The dual-curable adhesive composition of claim 1, wherein the thiol group-containing compound is a primary thiol comprising two or more thiol groups.

5. The dual-curable adhesive composition of claim 1, wherein the (meth)acrylate oligomer is a urethane (meth)acrylate oligomer having a viscosity in a range of 2,000 to 20,000 cps (25° C.), a glass transition temperature (Tg) in a range of −70 to 10° C., and a weight average molecular weight (Mw) in a range of 2,000 to 20,000 g/mol.

6. The dual-curable adhesive composition of claim 1, wherein a number of polymerizable functional groups comprised in the multifunctional (meth)acrylate monomer is in a range of 2 to 6.

7. The dual-curable adhesive composition of claim 1, wherein a mixing ratio of the monofunctional (meth)acrylate monomer and the multifunctional (meth)acrylate monomer is in a range of 1:0.1 to 1 by weight.

8. The dual-curable adhesive composition of claim 1, wherein the photo-initiator is a compound having an absorption wavelength in a region in a range of 200 nm to 400 nm.

9. The dual-curable adhesive composition of claim 1, comprising, with respect to the total weight of the adhesive composition:
   10 to 50 parts by weight of the (meth)acrylate oligomer;
   3 to 40 parts by weight of the bifunctional or more multifunctional (meth)acrylate monomer;
   10 to 60 parts by weight of the monofunctional (meth)acrylate monomer;
   0.05 to 2 parts by weight of the photo-initiator;
   0.05 to 1.5 parts by weight of the thermal initiator; and
   2 to 20 parts by weight of the thiol group-containing compound.

10. The dual-curable adhesive composition of claim 9, wherein the composition further comprises 10 to 40 parts by weight of an adhesion promoter.

11. The dual-curable adhesive composition of claim 9, wherein the composition further comprises a polymerization inhibitor.

12. The dual-curable adhesive composition of claim 1, having: a viscosity in a range of 100 to 10,000 cps (25° C.), room temperature (25° C.) storage stability for 2 days or more, and low-temperature (−20 to 0° C.) storage stability for 4 months or more.

13. The dual-curable adhesive composition of claim 1, used for an optical member including a light shield portion.

14. The dual-curable adhesive composition of claim 1, wherein a thickness of the adhesive composition is 200±30 μm, and
  when irradiated for 10 seconds under conditions of a wavelength of 385 nm and an accumulated light amount of 5,000 mJ/cm², a curing length ratio ($L_R$) of a light shield portion represented by the following Equation 1 is 50% or more compared to an adhesive composition not including the thiol group-containing compound:

$$L_R = (L_2 - L_1)/L_1 \times 100 \quad \text{[Equation 1]}$$

wherein in the above Equation,
  $L_2$ is an adhesive composition comprising at least one type of photo-curable compound, a photo-initiator, a thermal initiator and a thiol group-containing compound, and
  $L_1$ is an adhesive composition comprising at least one type of photo-curable compound, a photo-initiator and a thermal initiator.

15. The dual-curable adhesive composition of claim 1, wherein the monofunctional (meth)acrylate monomer and the bifunctional or more multifunctional (meth)acrylate monomer do not contain a hydroxy group.

* * * * *